United States Patent
Wu et al.

(10) Patent No.: US 11,796,066 B2
(45) Date of Patent: Oct. 24, 2023

(54) DUAL MOTION SHUTOFF VALVE

(71) Applicant: ITT Manufacturing Enterprises LLC, Wilmington, DE (US)

(72) Inventors: Szu-Nien Wu, Wilmington, DE (US); Arthur Inocelda, Wilmington, DE (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 0 days.

(21) Appl. No.: 17/777,061

(22) PCT Filed: Nov. 21, 2019

(86) PCT No.: PCT/US2019/062528
§ 371 (c)(1),
(2) Date: May 16, 2022

(87) PCT Pub. No.: WO2021/101544
PCT Pub. Date: May 27, 2021

(65) Prior Publication Data
US 2022/0397199 A1    Dec. 15, 2022

(51) Int. Cl.
*F16K 1/20*    (2006.01)
*F16K 1/24*    (2006.01)

(52) U.S. Cl.
CPC .............. *F16K 1/2007* (2013.01); *F16K 1/24* (2013.01)

(58) Field of Classification Search
CPC ........ F16K 1/2007; F16K 1/24; F16K 31/524; F16K 35/06
See application file for complete search history.

(56) References Cited

U.S. PATENT DOCUMENTS

| | | |
|---|---|---|
| 3,498,583 A | 3/1970 | Friedell |
| 3,776,505 A | 12/1973 | Nakanishi |
| 4,288,060 A | 9/1981 | Mittell |
| 4,763,877 A | 8/1988 | Kennedy |

(Continued)

FOREIGN PATENT DOCUMENTS

| | | | | |
|---|---|---|---|---|
| JP | 2000240816 A | * | 9/2000 | ................ F16K 1/24 |
| JP | 3201573 U | * | 12/2015 | ............. F16K 1/221 |

OTHER PUBLICATIONS

International Search Report and Written Opinion for International App No. PCT/US2019/062528, pp. 13.

*Primary Examiner* — Marina A Tietjen
(74) *Attorney, Agent, or Firm* — Mannava & Kang, P.C.

(57) ABSTRACT

Technologies are described for dual motion shutoff valve assemblies. In various examples, valve assemblies include a sequencing drive mechanism and an eccentric shaft mechanism operable to linearly retract the valve disk from a gasket surface to effectively reduce scratching and friction of the gasket surface during valve opening and closing operations. In some examples, the sequencing drive may include two interlocking concentric driver rings, a retaining housing, and roller lock pins. Three guided pins of the sequencing drive may be configured to prevent the valve from rotating, while also causing the valve to retract linearly from the gasket surface via the eccentric shaft. Following retraction, an inner driver of the sequencing drive may allow the roller lock pins to move and lock the outer driver, which in turn may lock the valve disk to the shaft and rotate along with the shaft, which may be a single or dual shaft.

17 Claims, 10 Drawing Sheets

(56) References Cited

U.S. PATENT DOCUMENTS

| | | |
|---|---|---|
| 5,076,737 A | 12/1991 | Loutsch et al. |
| 5,567,118 A | 10/1996 | Grgurich et al. |
| 5,567,128 A | 10/1996 | Volz et al. |
| 5,666,991 A | 9/1997 | Hartig |
| 5,755,427 A | 5/1998 | Koskinas |
| 2009/0274566 A1 | 11/2009 | Fong |
| 2010/0200791 A1 | 8/2010 | Yung et al. |
| 2011/0162730 A1 | 7/2011 | Gotthelf |

* cited by examiner

DUAL MOTION SHUTOFF VALVE

CROSS-REFERENCE TO RELATED APPLICATIONS

The present application is a U.S. National Stage filing under 35 U.S.C. § 371 of International Application PCT/US19/62528, filed Nov. 21, 2019.

BACKGROUND

Unless otherwise indicated herein, the materials described in this section are not prior art to the claims in this application and are not admitted as prior art by inclusion in this section.

Ball valves are quarter-turn valves that often use a hollow, perforated, and pivoting ball to control flow through the valve assembly. When the ball's hole is in line with a flow path, the valve is open and when the hole is pivoted 90-degrees, the valve is closed. Ball valves are often used in shutoff and control applications and may be preferred over gates and globe valves because of their durability, reliability, and ability to withstand high pressures and temperatures.

Butterfly valves are similar to ball valves. A butterfly valve includes a disk (a "butterfly") positioned in the center of the flow path with a shaft passing through the disk to an actuator outside of the valve. Rotating the actuator causes the disk to turn between parallel and perpendicular positions in the flow path. Unlike a ball valve, the disk is always present within the flow path, which induces a decrease in pressure even when the valve is in the open position. In operation, the valve can be changed between fully open and fully closed by rotating the disk by a quarter turn. The butterfly valve may also be opened incrementally to throttle flow. Some ball or butterfly valve assemblies may include a solid seal covered with or made from a reduced-friction material that is urged against the metal ball or butterfly disk as installed.

SUMMARY

The present disclosure generally describes dual motion shutoff valve assemblies.

According to some examples, a dual motion shutoff valve assembly may include a valve body having an inner wall, a first port defined by a first portion of the inner wall, a second port defined by a second portion of the inner wall, and a controllable flow path defined by a third portion of the inner wall between the first port and the second port; a first gasket disposed about the first port; a valve disk disposed in the controllable flow path, where the valve disk includes a spherical surface portion configured to selectively engage the first gasket in a closed position of the valve assembly effective to form a seal thereon; and a shaft coupled to the valve disk, where the shaft is configured to actuate a position of the valve disk between the closed position and an open position such that the valve disk is placed in a retracted position relative to the first gasket when the shaft is moved to the open position from the closed position or to the closed position from the open position.

According to other examples, the valve assembly may further include a sequencing drive assembly coupled to the shaft and the valve disk, where the sequencing drive assembly is configured to actuate a position of the shaft between the open position and the closed position. The sequencing drive assembly may be configured to cause the valve disk to disengage the first gasket and retract linearly from the first gasket during a rotation of the shaft from the closed position to the retracted position; subsequently cause the valve disk to move rotationally from the retracted position to the open position; cause the valve disk to move rotationally from the open position to the retracted position; and subsequently cause the valve disk to extend linearly toward the first gasket and to engage the first gasket during another rotation of the shaft from the retracted position to the closed position. The sequencing drive assembly may also be configured to from the closed position, actuate an about 60-degree rotation of the shaft during which the valve disk is transitioned into the retracted position from the closed position and actuate a further about 90-degree rotation of the shaft during which the valve disk is transitioned into the open position from the retracted position. The sequencing drive assembly may also be configured to from the open position, actuate an about 90-degree rotation of the shaft during which the valve disk is transitioned into the retracted position from the open position and actuate a further about 60-degree rotation of the shaft during which the valve disk is transitioned into the closed position from the retracted position.

According to further examples, the sequencing drive assembly may include an inner driver ring configured to surround the shaft, the inner driver ring having a sidewall and two depressions about opposite locations on an outside surface of the sidewall of the inner driver ring; an outer driver ring configured to surround the inner driver ring, the outer driver ring having a sidewall and two apertures about opposite locations of the sidewall of the outer driver ring; a retaining housing configured to surround the inner driver ring and the outer driver ring, the retaining housing having a sidewall and two depressions about opposite locations of an inside surface of the sidewall of the retaining housing; and a pair of interlocking rollers configured to slidably engage in the two apertures about the opposite locations of the sidewall of the outer driver ring. The pair of interlocking rollers may be configured to engage the outer driver ring and the retaining housing together by sliding into the two depressions at opposite locations of the inside surface of the sidewall of the retaining housing during a rotation of the shaft from the closed position to the retracted position or from the retracted position to the closed position of the valve assembly effective to cause the valve disk to remain angularly stationary during the rotation of the shaft; and engage the inner driver ring and the outer driver ring together by sliding into the two depressions at opposite locations of the outside surface of the sidewall of the inner driver ring during another rotation of the shaft from the retracted position to the open position or from the open position to the retracted position of the valve assembly effective to cause the valve disk to rotate during the other rotation of the shaft.

According to yet other examples, the sequencing drive assembly may further include three guide pins that extend from a bottom surface of the outer driver ring, the three guide pins configured to engage three corresponding apertures in a top bracket coupled to the valve disk. The three corresponding apertures in the top bracket may be shaped to allow the three guide pins to move freely during a rotation of the shaft from the closed position to the retracted position or from the retracted position to the closed position of the valve assembly effective to cause the valve disk to remain angularly stationary during the rotation of the shaft, or cause the top bracket to move during a rotation of the shaft from the retracted position to the open position or from the open position to the retracted position of the valve assembly effective to cause the valve disk to rotate during the rotation of the shaft.

According to some examples, the valve disk may include a top bracket that extends from an upper portion of the spherical surface portion of the valve disk and includes a first aperture for the shaft to pass through, where an upper cammed portion of the shaft is configured to slidably engage into the first aperture of the top bracket; and a bottom bracket that extends from a lower portion of the spherical surface portion of the valve disk and includes a second aperture for the shaft to pass through, where a lower cammed portion of the shaft is configured to slidably engage into the second aperture of the bottom bracket. The valve assembly may further include a top valve link movably coupled to the top bracket; a bottom shaft movably coupled to the bottom bracket; and a bottom valve link movably coupled to the bottom bracket, where the top valve link includes a ball bearing to hold the shaft and a third aperture adapted to receive a locking pin that is inserted through the top bracket to secure the top valve link to the top bracket and the bottom valve link includes another ball bearing to hold the shaft and a fourth aperture adapted to receive another locking pin that is inserted through the bottom bracket to secure the bottom valve link to the bottom bracket.

According to other examples, a dual motion shutoff valve assembly may include a valve body having an inner wall, a first port defined by a first portion of the inner wall, a second port defined by a second portion of the inner wall, and a controllable flow path defined by a third portion of the inner wall between the first port and the second port; a first gasket disposed about the first port; a valve disk disposed in the controllable flow path, where the valve disk comprises a spherical surface portion configured to selectively engage the first gasket in a closed position of the valve assembly effective to form a seal thereon; and a top shaft coupled to an upper portion of the valve disk, wherein the top shaft is configured to actuate a position of the valve disk between the closed position and an open position such that the valve disk is placed in a retracted position relative to the first gasket when the top shaft is moved to the open position from the closed position or to the closed position from the open position.

According to further examples, the valve assembly may further include a bottom shaft coupled to a lower portion of the valve disk, and the valve disk may further include a bottom bracket that extends from a lower portion of the spherical surface portion of the valve disk and includes a first aperture for the bottom shaft to slidably engage. The valve assembly may further include a sequencing drive assembly coupled to the top shaft and the valve disk, where the sequencing drive assembly is configured to actuate a position of the top shaft between the open position and the closed position. The sequencing drive assembly may be configured to cause the valve disk to disengage the first gasket and retract linearly from the first gasket during a rotation of the top shaft from the closed position to the retracted position; subsequently cause the valve disk to move rotationally from the retracted position to the open position; cause the valve disk to move rotationally from the open position to the retracted position; and subsequently cause the valve disk to extend linearly toward the first gasket and to engage the first gasket during another rotation of the top shaft from the retracted position to the closed position.

According to yet other examples, the sequencing drive assembly may include an inner driver ring configured to surround the top shaft, the inner driver ring having a sidewall and two depressions about opposite locations on an outside surface of the sidewall of the inner driver ring; an outer driver ring configured to surround the inner driver ring, the outer driver ring having a sidewall and two apertures about opposite locations of the sidewall of the outer driver ring; a retaining housing configured to surround the inner driver ring and the outer driver ring, the retaining housing having a sidewall and two depressions about opposite locations of an inside surface of the sidewall of the retaining housing; and a pair of interlocking rollers configured to slidably engage in the two apertures about the opposite locations of the sidewall of the outer driver ring. The pair of interlocking rollers may be configured to engage the outer driver ring and the retaining housing together by sliding into the two depressions at opposite locations of the inside surface of the sidewall of the retaining housing during a rotation of the top shaft from the closed position to the retracted position or from the retracted position to the closed position of the valve assembly effective to cause the valve disk to remain angularly stationary during the rotation of the top shaft; and engage the inner driver ring and the outer driver ring together by sliding into the two depressions at opposite locations of the outside surface of the sidewall of the inner driver ring during another rotation of the top shaft from the retracted position to the open position or from the open position to the retracted position of the valve assembly effective to cause the valve disk to rotate during the other rotation of the top shaft.

According to other examples, the sequencing drive assembly may further include three guide pins that extend from a bottom surface of the retaining housing, the three guide pins configured to engage three corresponding apertures in a top bracket coupled to the valve disk. The three corresponding apertures in the top bracket may be shaped to allow the three guide pins to move freely during a rotation of the top shaft from the closed position to the retracted position or from the retracted position to the closed position of the valve assembly effective to cause the valve disk to remain angularly stationary during the rotation of the top shaft, or cause the top bracket to move during a rotation of the top shaft from the retracted position to the open position or from the open position to the retracted position of the valve assembly effective to cause the valve disk to rotate during the rotation of the top shaft. The valve assembly may also include a bottom shaft coupled to a lower portion of the valve disk; a top valve link movably coupled to a top bracket that extends from an upper portion of the spherical surface portion of the valve disk; and a bottom bracket movably coupled to a bottom shaft that extends from a lower portion of the spherical surface portion of the valve disk.

According to further examples, a dual motion shutoff valve assembly may include a valve body having an inner wall, a first port defined by a first portion of the inner wall, a second port defined by a second portion of the inner wall, and a controllable flow path that defined by a third portion of the inner wall between the first port and the second port; a first gasket disposed about the first port; a second gasket disposed about the second port; a valve disk disposed in the controllable flow path, where the valve disk includes a spherical surface portion configured to selectively engage the first gasket in a closed position of the valve assembly effective to form a seal thereon; an eccentric shaft coupled to the valve disk, where the shaft is configured to actuate a position of the valve disk between the closed position and an open position; and a sequencing drive assembly coupled to the shaft and the valve disk, where the sequencing drive assembly is configured to actuate a position of the shaft such that the valve disk is placed in a retracted position relative to the first gasket when the shaft is moved to the open position from the closed position or to the closed position from the open position.

According to some examples, the sequencing drive assembly may be configured to cause the valve disk to disengage the first gasket and retract linearly from the first gasket during a rotation of the shaft from the closed position to the retracted position; subsequently cause the valve disk to move rotationally from the retracted position to the open position; cause the valve disk to move rotationally from the open position to the retracted position; and subsequently cause the valve disk to extend linearly toward the first gasket and to engage the first gasket during another rotation of the shaft from the retracted position to the closed position. The shaft may include a top shaft coupled to an upper portion of the valve disk, and a bottom shaft coupled to a lower portion of the valve disk. The valve disk may include a top bracket that extends from the upper portion of the valve disk and includes a first aperture for the top shaft to pass through, where an upper cammed portion of the top shaft is configured to slidably engage into the first aperture of the top bracket, and a bottom bracket that extends from the lower portion of the valve disk and includes a second aperture for the bottom shaft to pass through, where a lower cammed portion of the lower shaft is configured to slidably engage into the second aperture of the bottom bracket.

According to other examples, the sequencing drive assembly may further include three guide pins that extend from a bottom surface of an outer driver ring, the three guide pins configured to engage three corresponding apertures in the top bracket coupled to the valve disk. The three corresponding apertures in the top bracket may be shaped to allow the three guide pins to move freely during a rotation of the top shaft from the closed position to the retracted position or from the retracted position to the closed position of the valve assembly effective to cause the valve disk to remain angularly stationary during the rotation of the top shaft, or cause the top bracket to move during another rotation of the top shaft from the retracted position to the open position or from the open position to the retracted position of the valve assembly effective to cause the valve disk to rotate during the other rotation of the top shaft. The valve assembly may also include a top valve link movably coupled to the top bracket; and a bottom shaft movably coupled to the bottom bracket.

According to yet other examples, a method to manufacture a dual motion shutoff valve assembly is described. The method may include forming a valve body having an inner wall, a first portion of the inner wall, a second portion of the inner wall, and a third portion of the inner wall, such that the first portion of the inner wall defines a first port of the valve body, the second portion of the inner wall defines a second port of the valve body, and the third portion of the inner wall, the first port, and the second port define a controllable flow path that extends along the inner wall between the first port and the second port of the valve body. The method may also include disposing a first gasket about the first port of the valve body; forming a valve disk to include at least a spherical surface portion; disposing the valve disk in the controllable flow path of the valve body such that the spherical surface portion selectively engages the first gasket in a closed position of the valve assembly effective to form a seal thereon; forming a shaft to actuate a position of the valve disk between the closed position and an open position; and coupling the shaft to the valve disk in an offset manner such that the valve disk is placed in a retracted position relative to the first gasket when the shaft is moved to the open position from the closed position or to the closed position from the open position.

According to some examples, the method may further include forming a sequencing drive assembly; and coupling the sequencing drive assembly to the shaft and the valve disk to actuate a position of the shaft between the open position and the closed position. Forming the sequencing drive assembly may include forming the sequencing drive assembly to cause the valve disk to disengage the first gasket and retract linearly from the first gasket during a rotation of the shaft from the closed position to the retracted position, and subsequently to cause the valve disk to move rotationally from the retracted position to the open position; and cause the valve disk to move rotationally from the open position to the retracted position, and subsequently cause the valve disk to extend linearly toward the first gasket and to engage the first gasket during another rotation of the shaft from the retracted position to the closed position. Forming the sequencing drive assembly may also include forming an inner driver ring to surround the shaft, the inner driver ring having a sidewall and two depressions about opposite locations on an outside surface of the sidewall of the inner driver ring; forming an outer driver ring to surround the inner driver ring, the outer driver ring having a sidewall and two apertures about opposite locations of the sidewall of the outer driver ring; forming a retaining housing to surround the inner driver ring and the outer driver ring, the retaining housing having a sidewall and two depressions about opposite locations of an inside surface of the sidewall of the retaining housing; and forming a pair of interlocking rollers to slidably engage in the two apertures about the opposite locations of the sidewall of the outer driver ring.

According to further examples, forming the outer driver ring, the retaining housing, and the pair of interlocking rollers may include arranging the pair of interlocking rollers to engage the outer driver ring and the retaining housing together by sliding into the two depressions at opposite locations of the inside surface of the sidewall of the retaining housing during a rotation of the shaft from the closed position to the retracted position or from the retracted position to the closed position of the valve assembly effective to cause the valve disk to remain angularly stationary during the rotation of the shaft. Forming the inner driver ring, the outer driver ring, and the pair of interlocking rollers may include arranging the pair of interlocking rollers to engage the inner driver ring and the outer driver ring together by sliding into the two depressions at opposite locations of the outside surface of the sidewall of the inner driver ring during a rotation of the shaft from the retracted position to the open position or from the open position to the retracted position of the valve assembly effective to cause the valve disk to rotate during the rotation of the shaft. Forming the shaft to actuate the position of the valve disk between the closed position and the open position may include forming a top shaft to actuate the position of the valve disk between the closed position and the open position; coupling the top shaft to an upper portion of the valve disk in an offset manner such that the valve disk is placed in a retracted position relative to the first gasket when the top shaft is moved to the open position from the closed position or to the closed position from the open position; forming a bottom shaft coupled to a lower portion of the valve disk; and coupling the bottom shaft to the lower portion of the valve disk.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
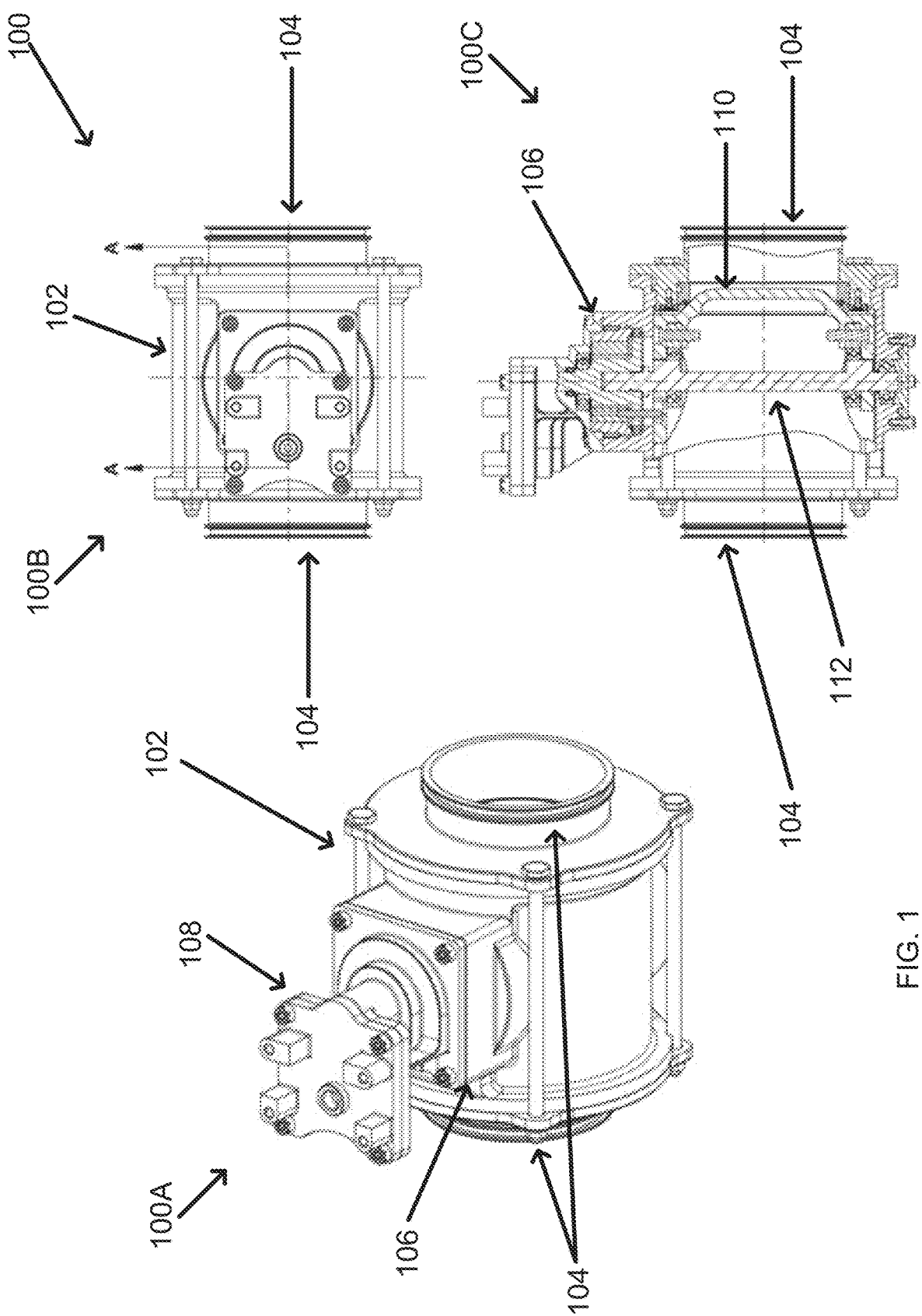
FIG. 1 illustrates different cutaway views of a valve assembly with dual motion shutoff capability.

all arranged in accordance with at least some embodiments described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems and/or devices associated with dual motion shutoff valve assemblies.

Briefly stated, technologies are generally described for dual motion shutoff valve assemblies. In various examples, the valve assemblies include a sequencing drive mechanism and an eccentric shaft mechanism operable to linearly retract the valve disk from a gasket surface to effectively reduce scratching and friction of the gasket surface during valve opening and closing operations. In some examples, the sequencing drive may include two interlocking concentric driver rings, a retaining housing, and roller lock pins. Three guided pins of the sequencing drive may be configured to prevent the valve from rotating, while also causing the valve to retract linearly from the gasket surface via the eccentric shaft. Following retraction, an inner driver of the sequencing drive may allow the roller lock pins to move and engage the outer driver, which in turn may engage the valve disk to the shaft and rotate along with the shaft, which may be a single or dual shaft.

FIG. 1 illustrates different cutaway views of a valve assembly with dual motion shutoff capability, arranged in accordance with at least some embodiments described herein.

Diagram 100 includes three views, 100A, 100B, and 100C of an example dual motion shutoff valve. View 100A is an isometric view of the valve assembly with a valve body 102, valve ports 104, sequencing drive assembly 106, and sequencing drive interface 108. View 100B is a top view of the valve assembly with valve body 102 and valve ports 104. View 100C is a side cross-sectional view of the valve assembly with the valve ports 104, sequencing drive assembly 106, valve disk 110, and shaft 112.

The valve body 102 may include an inner wall, a first portion of which may define a first one of the valve ports 104 and a second portion of the inner wall may define a second one of the valve ports 104. In some examples, the valve ports 104 may be designated as ingress and egress ports. The inner wall of the valve body and the valve ports 104 may define a controllable flow path that extends along the inner wall between the first one of the valve ports 104 and the second one of the valve ports 104. Flow of liquids or gases through the controllable flow path may be controlled by the valve disk 110, which may be rotated by the shaft 112 between an open position (aligned with the controllable flow path) and closed position (in contact with one of the valve ports and perpendicular to the controllable flow path).

A spherical surface portion of the valve disk 110 may be adapted to seal one of the valve ports 104 in a closed position of the valve assembly, for example, by engaging a corresponding gasket to affect a seal or block to the corresponding port. The spherical surface portion of the valve disk 110 may be considerably flat, meaning the surface portion may include small irregularities or may be angled without affecting its functionality. To reduce friction between the spherical surface portion of the valve disk 110 and the gasket, a valve assembly according to some examples, may employ an eccentric shaft and a sequencing drive mechanism to affect dual motion shutoff (and opening).

In some examples, a partial or hemispherical rotatable member may be used instead of the valve disk 110. For example, the hemispherical shape of the rotatable member may be formed as a half of a sphere with a center portion substantially hollowed out on one side of the sphere. The shape of the rotatable member with the hemispherical shape may be coupled to the shaft 112 in an offset position to facilitate improved volume of flow for fluids or gases through the controllable flow path.

Figure 2:
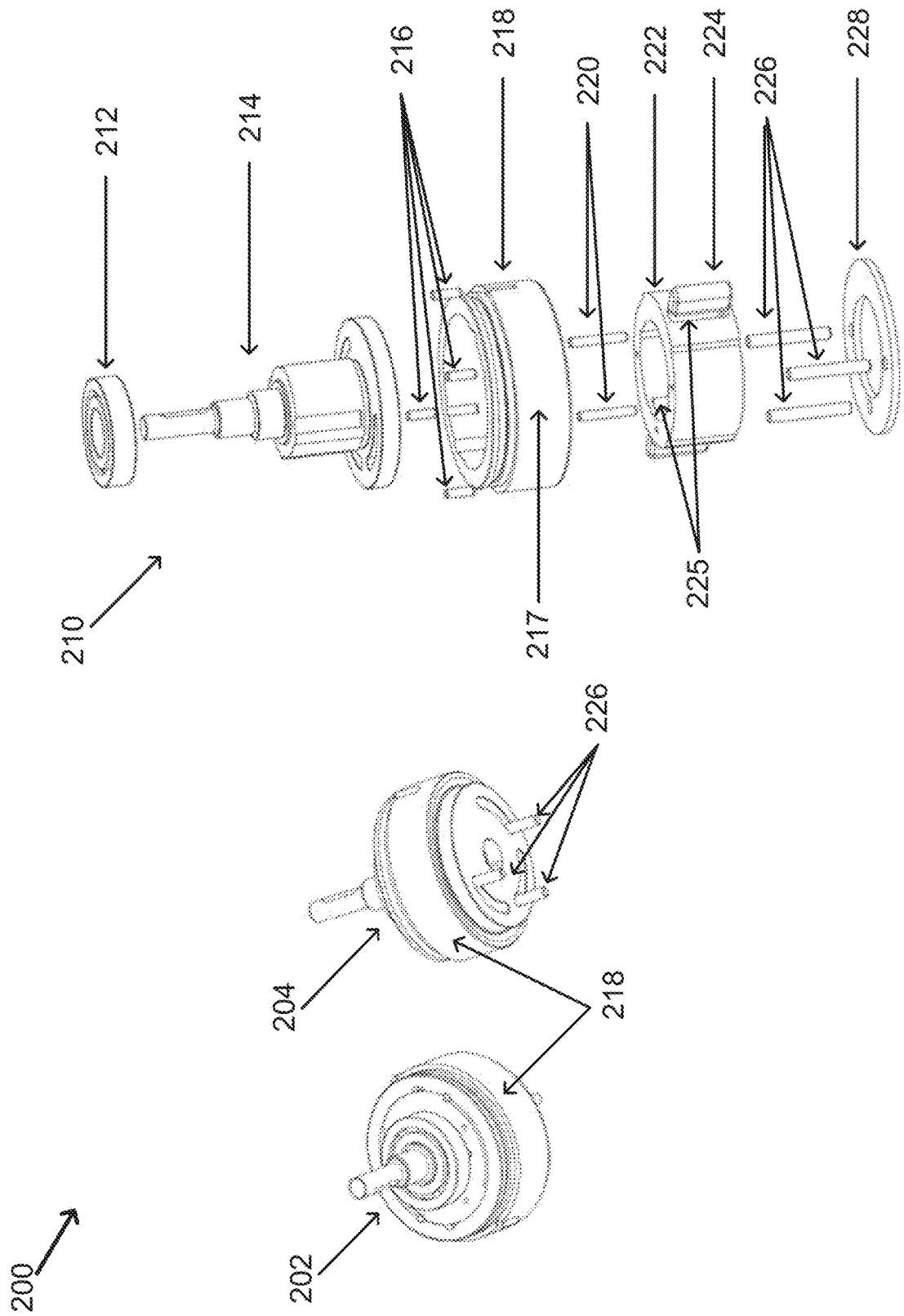
FIG. 2 illustrates exploded assembly views of a sequencing drive mechanism for a dual motion shutoff valve assembly.

FIG. 2 illustrates exploded assembly views of a sequencing drive mechanism for a dual motion shutoff valve assembly, arranged in accordance with at least some embodiments described herein.

Diagram 200 includes three views, 202, 204, and 210, of an example sequencing drive mechanism. Views 202 and 204 are perspective views of the sequence driving mechanism from different angles showing retaining housing 218 and guide pins 226. View 210 shows an exploded assembly view of the sequencing drive assembly, which includes ball bearing 212, inner driver ring 214, first set of interlocking dowel pins 216, retaining housing 218, second set of interlocking dowel pins 220, outer driver ring 222, interlocking rollers 224, guide pins 226, and washer 228.

Some of the illustrated sequencing drive mechanisms are configured to linearly retract the valve disk from a gasket of a valve port (e.g., a spring energized seal gasket), and then translate the linear motion of the valve disk to a rotational motion such that the valve disk may be rotated into the flow stream to an open position, and vice versa for the closing operation. The retaining housing 218 may have a disk-shaped form with a round sidewall 217. The disk-shaped form or the round form may deviate from a circle without affecting their configuration or functionality. The retaining housing 218 may contain the outer driver ring 222 that fits inside a cavity formed by the sidewall 217. The outer driver ring 222 may be fitted around the inner driver ring 214. The inner driver ring 214 may be engaged together with the eccentric shaft. The interlocking rollers 224 may be located about 180 degrees apart and fit in cavities 225 in the outer driver ring 222. The interlocking rollers 224 may be effective to engage combinations of the inner driver ring 214, the outer driver ring 222, and the retaining housing 218 in different phases of valve opening and closing operations (e.g., retraction, rotation). The outer driver ring 222 may include three pressed fit guide pins 226, which may fit onto the slots of valve disk (shown in FIGS. 5A and 5B).

Figure 3:
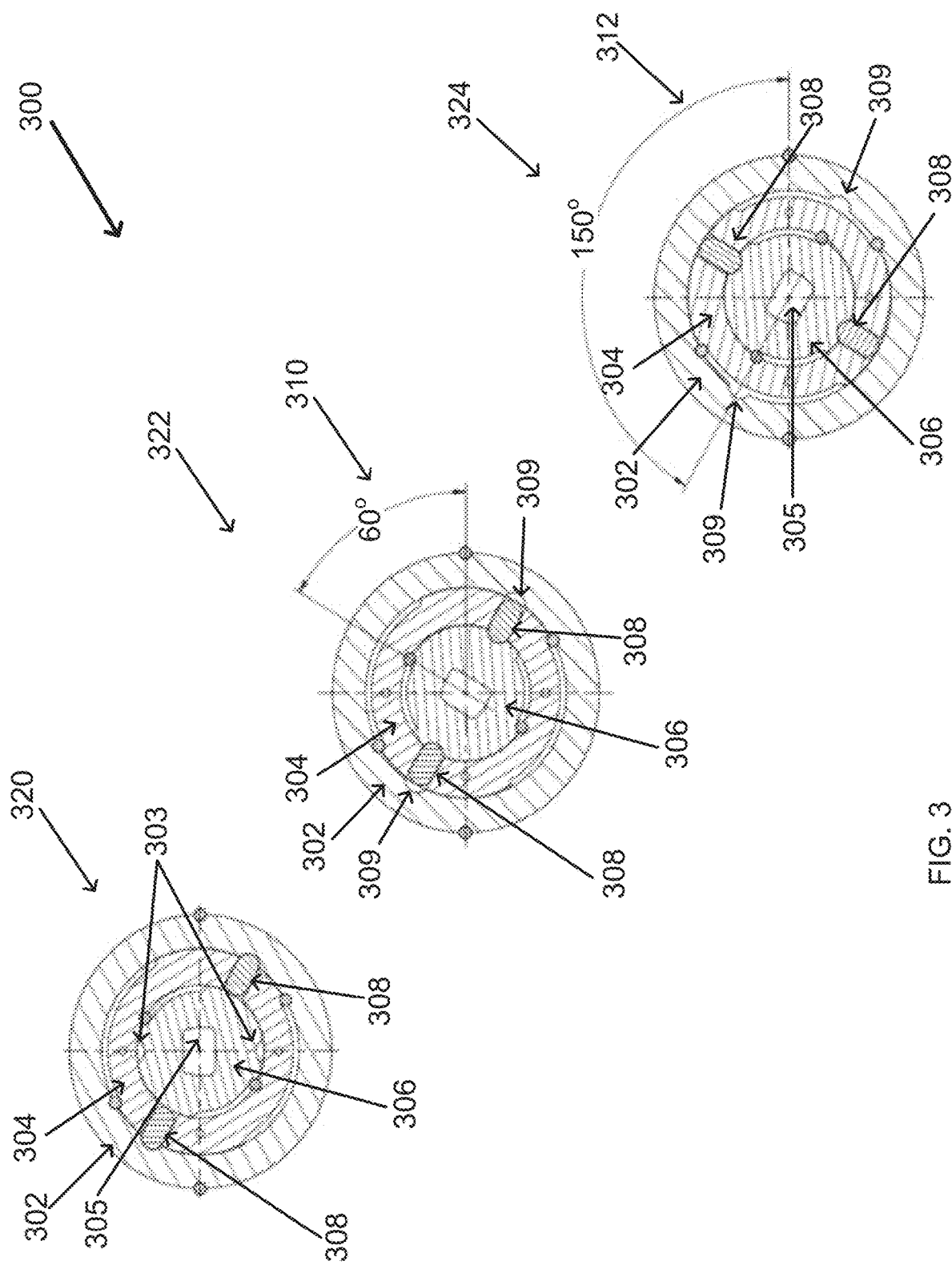
FIG. 3 illustrates various cross-sectional top views of an example sequencing drive mechanism where the disk of the valve assembly is oriented in different positions during operation of the mechanism.

FIG. 3 illustrates various cross-sectional top views of an example sequencing drive mechanism where the disk of the valve assembly is oriented in different positions during operation of the mechanism, arranged in accordance with at least some embodiments described herein.

Diagram 300 illustrates three cross-sectional top views, 320, 322, and 324 of an example sequencing drive mechanism. View 320 illustrates a closed position with retaining housing 302, outer driver ring 304, inner driver ring 306, depressions 303 located about an outer surface of the inner driver ring 306, shaft 305, and interlocking rollers 308. View 322 illustrates a retracted position (e.g., about a 60-degree rotation) 310 with interlocking rollers 308 moved to a position out of the depressions 309 of the retaining housing 302 into the depressions 303 of the inner driver ring 306 to engage the inner driver ring 306 and the outer driver ring 304 together, in addition to the same parts as in view 320. View 324 illustrates an open position (e.g., about a 150-degree rotation) 312, where the inner driver ring 306 and the outer driver ring 304 are engaged together by the interlocking rollers 308 in the depressions 303 of the inner driver ring 306 and rotated by about 90 degrees from the position in view 322 (relative to retaining housing 302).

While in the closed position (view 320), the valve disk is urged against a gasket via actuator and fluid pressure. During a first portion of an operation to open the valve assembly, the shaft 305 is rotated and the inner driver ring 306 rotates while the outer driver ring 304 is maintained in engagement with the retaining housing 302 by the interlocking rollers 308 in depressions 309 of the retaining housing 302 (i.e., the outer driver ring remains stationary). During the first portion of the operation to open the valve assembly, the shaft 305, engaged together with the inner driver ring 306, may rotate by about 60 degrees such that the eccentric shaft cam acts on the valve disk and links to linearly retract the valve disk from a sealing surface of the gasket (e.g., linearly retract the disk from the gasket surfaces by about 0.060 inch). A top bracket of the valve disk (shown in FIGS. 5A and 5B) may include three slots that allow for the linear retraction motion of the valve disk without being obstructed by the three guide pins on the outer driver ring 304. Upon completion of the about 60-degree the rotation at the end of the first portion of the operation to open the valve assembly, the inner driver ring 306 may reach a position, where depressions 303 on the outer surface of the inner driver ring 306 align with corresponding cavities (cavities 225 in FIG. 2) on the outer driver ring 304, and the inner driver ring 306 may stop and engage the outer driver ring 304. To affect the engagement of the inner driver ring 306 with the outer driver ring 304, the interlocking rollers 308 may move to a position out of the depressions 309 of the retaining housing 302 and into the depressions 303 of the inner driver ring 306.

In a second portion of the operation to open the valve assembly, the shaft 305 may further rotate the inner driver ring 306, which may in turn also rotate the outer driver ring 304, now engaged together with the inner driver ring 306. Thus, the shaft 305 may rotate both the inner and outer driver rings an additional amount before being stopped via the actuator assembly. During this rotation the three guide pins on the outer driver ring 304 may be configured to engage the slots in the valve disk (shown in FIG. 4C) such that the valve disk assembly rotates along with the outer driver ring 304, The second portion of the operation to open the valve assembly may involve an additional rotation by the shaft 305 (and, thereby the valve disk) by about 90 degrees, which may orientate the valve disk such that a spherical surface of the valve disk is aligned with the controllable flow path to place the valve assembly in open position. The process may be reversed for the closing operation.

While an about 60-degree rotation of the shaft is used for the first portion of the operation to open the valve assembly (retraction), embodiments are not limited to a 60-degree turn. Various implementations may utilize 45-degree, 50-degree, 55-degree, 65-degree, or similar rotations to affect a linear retraction of the valve disk from the gasket surfaces. Furthermore, an about 90-degree rotation used in the second portion of the operation to open the valve assembly is also not intended as a limitation on embodiments. Indeed, gas or liquid flow may begin as soon as the valve disk is retracted and the second rotation begins. Thus, depending on the amount of desired flow, any rotation angle may be used for various degrees of open position of the valve assembly.

Figure 4A:
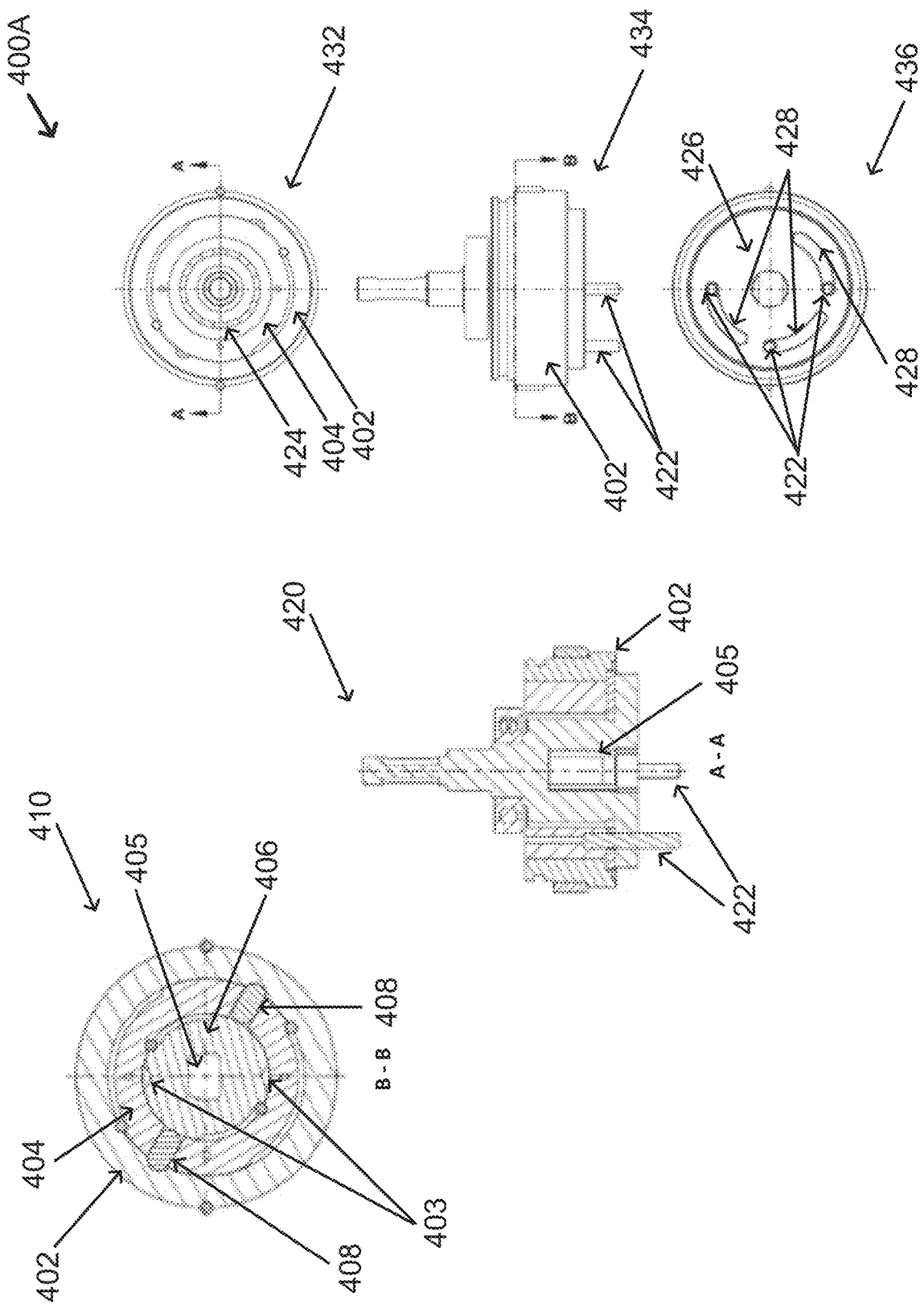
FIG. 4A illustrates various cross-sectional and assembly views of a sequencing drive mechanism during a closed position of the disk of the valve assembly.

FIG. 4A illustrates various cross-sectional and assembly views of a sequencing drive mechanism during a closed position of the disk of the valve assembly, arranged in accordance with at least some embodiments described herein.

Diagram 400A includes cross-sectional top view 410 of the sequencing drive mechanism in the closed position with retaining housing 402, outer driver ring 404, inner driver ring 406, depressions 403 on an outside surface of the inner driver ring 406, and interlocking rollers 408. Diagram 400A further includes cross-sectional side view 420 of the sequencing drive mechanism with retaining housing 402, shaft 405, and guide pins 422. Diagram 400A also includes top view 432 of the sequencing drive mechanism with ball bearing 424, outer driver ring 404, and retaining housing 402; side view 434 of the sequencing drive mechanism with retaining housing 402 and guide pins 422; and bottom view 436 of the sequencing drive mechanism with guide pins 422, washer 426, and slotted guide holes 428 of the inner driver ring 406.

In the closed position illustrated in diagram 400A, the retaining housing 402 and the outer driver ring 404 are engaged together through the interlocking rollers 408. The inner driver ring 406 is free to rotate (with the shaft 405). As shown in the bottom view 436 of the sequencing drive mechanism, the guide pins 422 may be at one extreme position within slotted guide holes 428 of the inner driver ring 406.

Figure 4B:
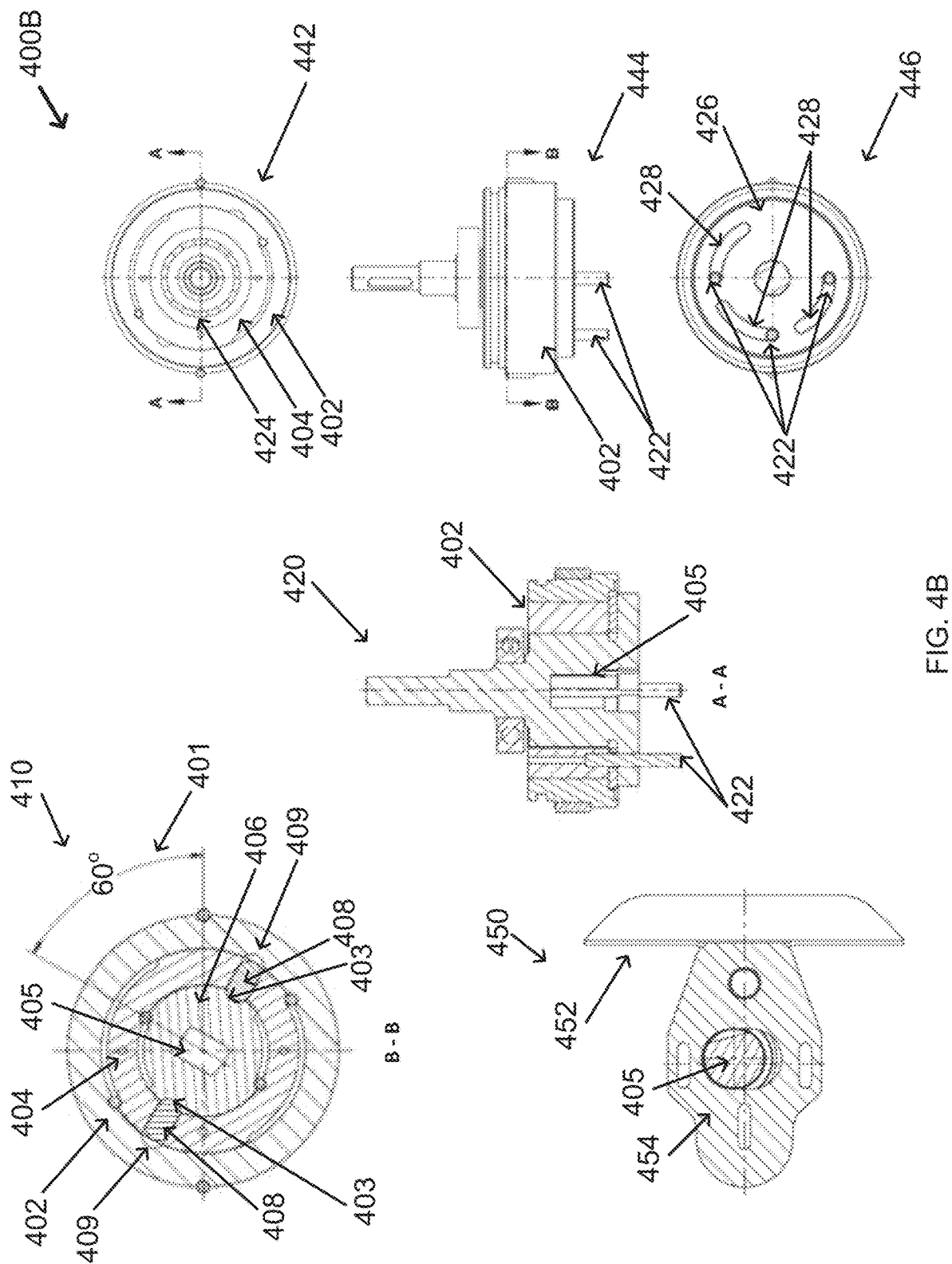
FIG. 4B illustrates various cross-sectional and assembly views of a sequencing drive mechanism during a retracted position of the disk of the valve assembly.

FIG. 4B illustrates various cross-sectional and assembly views of a sequencing drive mechanism during a retracted position of the disk of the valve assembly, arranged in accordance with at least some embodiments described herein.

Diagram 400B includes cross-sectional top view 410 of the sequencing drive mechanism in the retracted position with retaining housing 402, retaining housing depressions 409, outer driver ring 404, inner driver ring 406, and interlocking rollers 408. Diagram 400B further includes cross-sectional side view 420 of the sequencing drive mechanism with retaining housing 402, shaft 405, and guide pins 422. Diagram 400B also includes top view 442 of the sequencing drive mechanism with ball bearing 424, outer driver ring 404, and retaining housing 402; side view 444 of the sequencing drive mechanism with retaining housing 402 and guide pins 422; and bottom view 446 of the sequencing drive mechanism with guide pins 422, washer 426, and slotted guide holes 428 of the inner driver ring 406. Diagram 400B further includes a cross-sectional bottom view 450 of the valve disk 452 and link 454 with the shaft 405 in the link 454.

In the retracted position illustrated in diagram 400B, the shaft 405 is rotated, for example, by about 60 degrees (401) relative to the retaining housing 402 (from the closed position of FIG. 4A). The interlocking rollers 408 move from the retaining housing depressions 409 to corresponding depressions 403 on an outer surface of the inner driver ring 406. Thus, the inner driver ring 406 and the outer driver ring 404 are engaged together and adapted to rotate with the shaft 405 for any further turns. As shown in the bottom view 446 of the sequencing drive mechanism, the guide pins 422 may be at another extreme position within the slotted guide holes 428 of the inner driver ring 406.

The about 60-degree rotation of the eccentric shaft causes the link 454 to retract the valve disk 452 from a closed position with a valve gasket. In an example implementation, the valve disk 452 may be disengaged from the valve gasket (retracted) by about 0.060 inch.

Figure 4C:
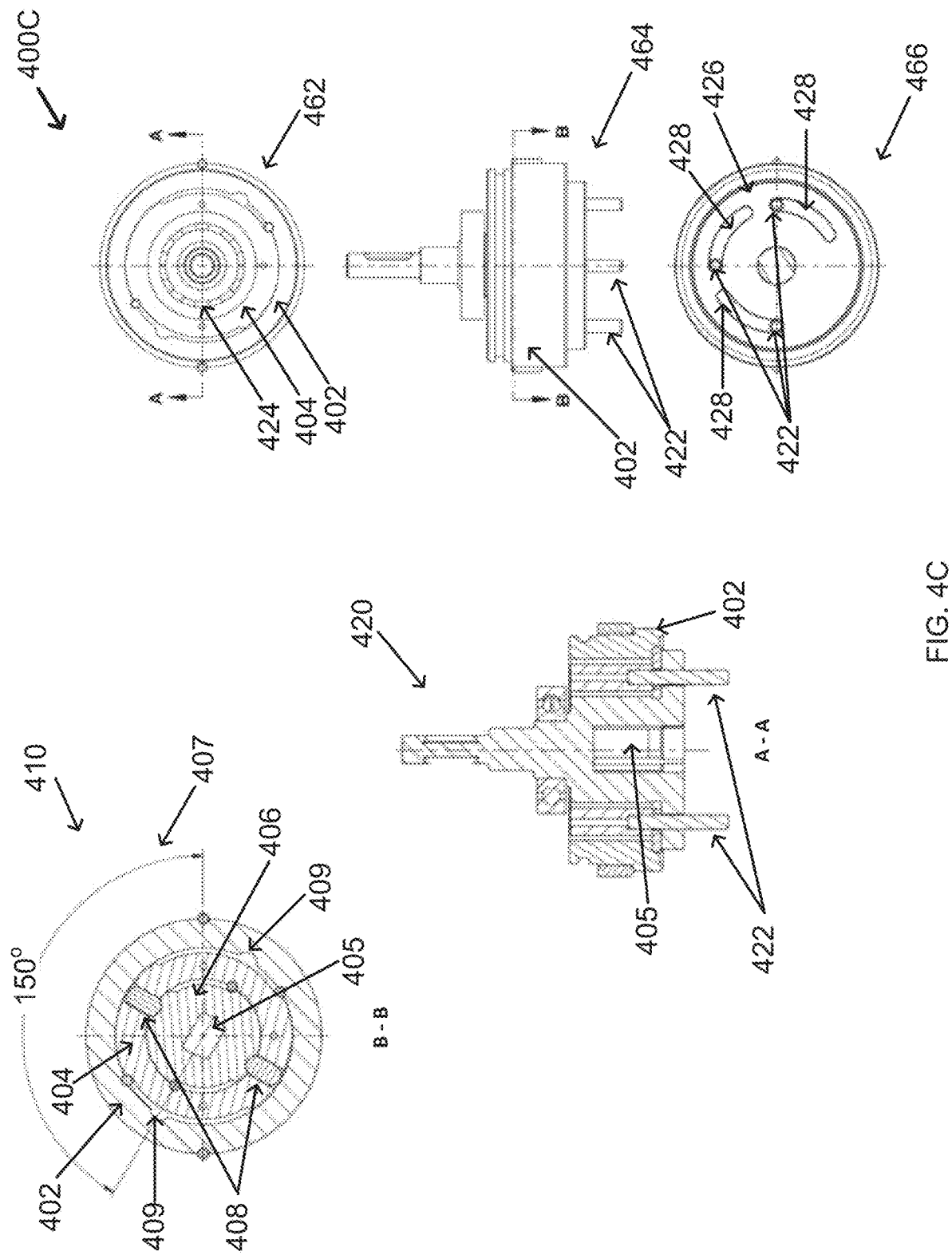
FIG. 4C illustrates various cross-sectional and assembly views of a sequencing drive mechanism during an open position of the disk of the valve assembly.

FIG. 4C illustrates various cross-sectional and assembly views of a sequencing drive mechanism during an open position of the disk of the valve assembly, arranged in accordance with at least some embodiments described herein.

Diagram 400C includes cross-sectional top view 410 of the sequencing drive mechanism in the open position with retaining housing 402, retaining housing depressions 409, outer driver ring 404, inner driver ring 406, interlocking rollers 408, and shaft 405. Diagram 400C further includes cross-sectional side view 420 of the sequencing drive mechanism with retaining housing 402, shaft 405, and guide pins 422. Diagram 400C also includes top view 462 of the sequencing drive mechanism with ball bearing 424, outer driver ring 404, and retaining housing 402; side view 464 of the sequencing drive mechanism with retaining housing 402 and guide pins 422; and bottom view 466 of the sequencing drive mechanism with guide pins 422, washer 426, and slotted guide holes 428 of the inner driver ring 406.

In the open position illustrated in diagram 400C, the shaft 405 is rotated by a total of about 150 degrees (407) relative to the retaining housing 402 (from the closed position of FIG. 4A). The interlocking rollers 408 are in the depressions 403 on the outer surface of the inner driver ring 406. Thus, the inner driver ring 406 and the outer driver ring 404 are engaged together and rotate with the shaft 405 for the additional about 90 degrees of turn from the retracted position of FIG. 4B. As shown in the bottom view 466 of the sequencing drive mechanism, the guide pins 422 may be at the other extreme position within the slotted guide holes 428 of the inner driver ring 406.

The interlocking rollers 408 engaging the inner driver ring 406 and the outer driver ring 404 together for the additional about 90-degree rotation from the retracted position may cause the valve disk to rotate by about 90 degrees in the controllable flow path. A spherical surface of the rotated valve disk may align with the controllable flow path placing the valve assembly in the open position. The rotation (of the valve disk) from the retracted position may substantially reduce a friction between the valve disk surface and gasket surface, thereby a friction-caused wear and required torque to turn the valve disk may also be reduced.

Figure 5A:
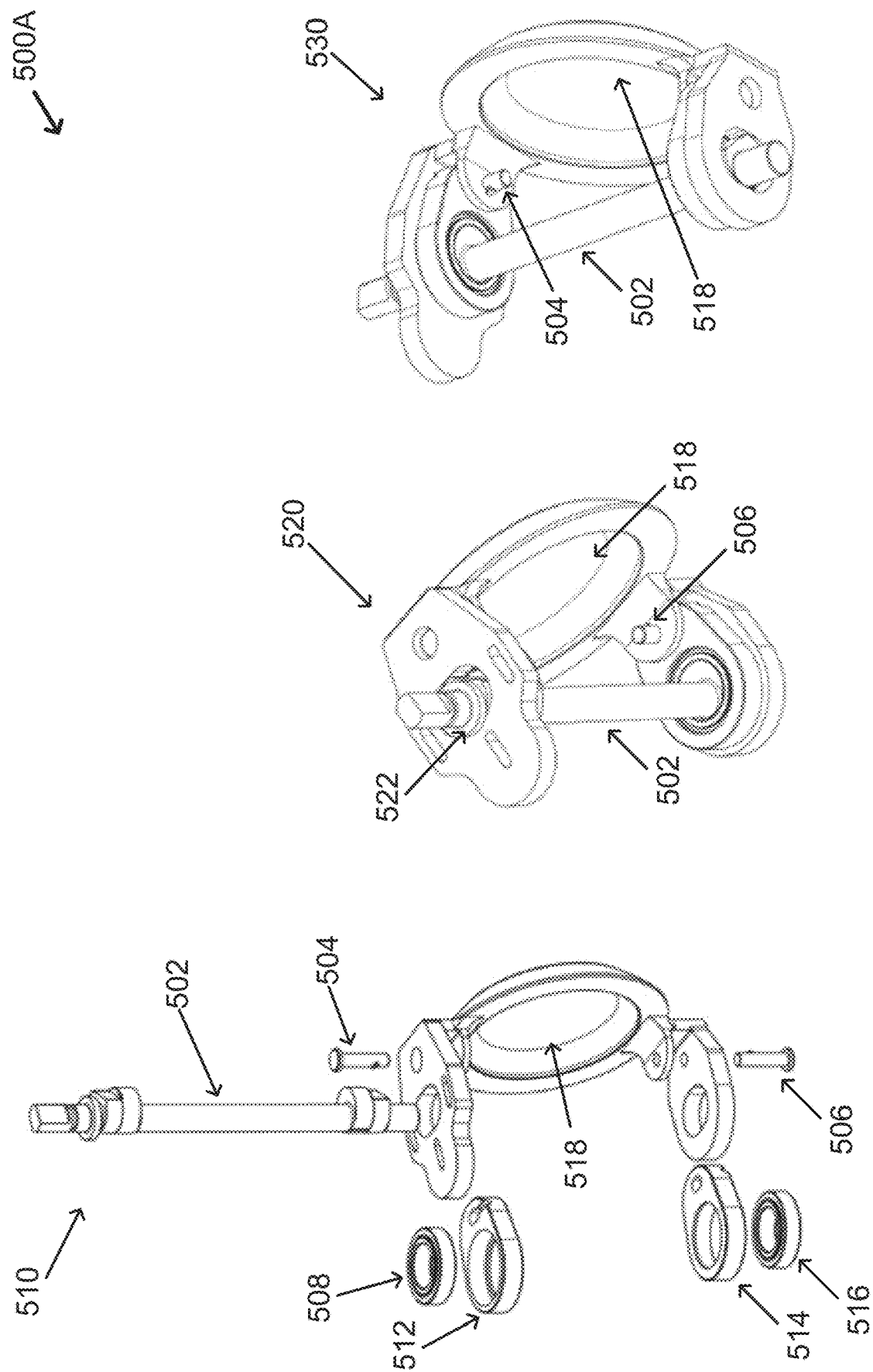
FIG. 5A illustrates an exploded assembly view and two perspective views of an eccentric shaft and attached disk of a dual motion shutoff valve assembly with a single shaft configuration.

FIG. 5A illustrates an exploded assembly view and two perspective views of an eccentric shaft and attached disk of a dual motion shutoff valve assembly with a single shaft configuration, arranged in accordance with at least some embodiments described herein.

Diagram 500A includes the exploded assembly view 510 that shows eccentric single shaft 502, top locking pin 504, top ball bearing 508, top valve link 512, valve disk 518, bottom valve link 514, bottom ball bearing 516 and bottom locking pin 506. First perspective view 520 of the shaft—valve disk assembly includes shaft 502, valve disk 518, bottom locking pin 506, and cammed portion 522 of the shaft 502. Second perspective view 530 includes same components of the shaft—valve disk assembly from a lower perspective with the top locking pin 504.

The top and bottom valve links 512 and 514 may fit over the cammed portion 522 of the eccentric single shaft 502. The top and bottom valve links 512 and 514 may also be attached to the valve disk 518 via the top and bottom locking pins 504, 506. In some examples, the top and bottom locking pins 504, 506 may be self-locking Clevis pins. The top and bottom ball bearings 508, 516 may provide for rotation of the shaft with less required torque. In some examples, the ball bearings may be shielded ball bearings against environmental wear and tear (e.g., effects of the fluids or gases flowing through the valve assembly).

Figure 5B:
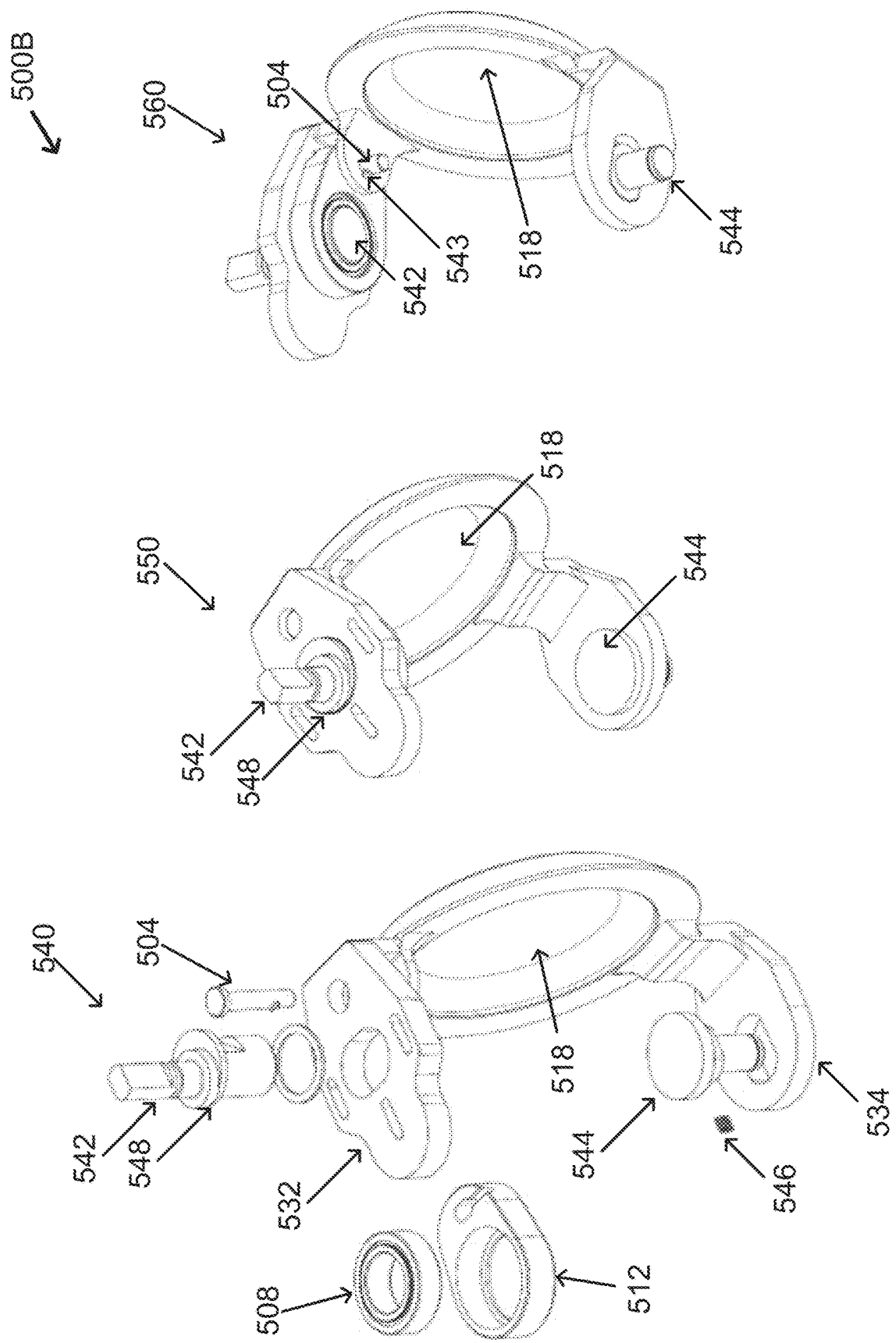
FIG. 5B illustrates an exploded assembly view and two perspective views of an eccentric shaft and attached disk of a dual motion shutoff valve assembly with a dual shaft configuration.

FIG. 5B illustrates an exploded assembly view and two perspective views of an eccentric shaft and attached disk of a dual motion shutoff valve assembly with a dual shaft configuration, arranged in accordance with at least some embodiments described herein.

Diagram 500B includes the exploded assembly view 540 that shows eccentric top shaft 542 and its cammed portion 548, top locking pin 504, top ball bearing 508, top valve link 512, valve disk 518, top bracket 532 of the valve disk, bottom bracket 534 of the valve disk, bottom shaft 544, and return spring 546. Bottom valve link 514, bottom ball bearing 516, bottom locking pin 506, may not be required and optional in some examples. First perspective view 550 of the shaft—valve disk assembly includes eccentric top shaft 542, cammed portion 548 of the eccentric top shaft, valve disk 518, and bottom shaft 544. Second perspective view 560 includes same components of the shaft—valve disk assembly from a lower perspective with self-locking extrusion 543 of the top locking pin 504.

The top valve link 512 may fit over the cammed portion 548 of the eccentric top shaft 542. The top valve link 512 (with the ball bearing 508 inside) may be affixed to the top bracket 532 of the valve disk 518 through the top locking pin 504. In some examples, the top locking pin 504 may be a self-locking (Clevis) pin with the self-locking extrusion 543. The cammed portion 548 of the eccentric top shaft 542 may be used to affect the retraction motion during an initial 60-degree rotation of the valve disk 518 such that the disk is disengaged from a gasket before the valve disk 518 makes its rotation within the controllable flow path of the valve assembly. The bottom shaft 544 may be in an oblong aperture within the bottom bracket 534 of the valve disk 518 to passively allow the retraction motion. Thus, the bottom shaft 544 may not actively cause the valve disk 518 to retract, but simply follow the motion of the eccentric top shaft 542. In other examples, a spring load within bottom shaft provided by the return spring 546 may promote linear retraction motion of valve disk 518 as the top eccentric shaft 542 begins to rotate.

Figure 6:
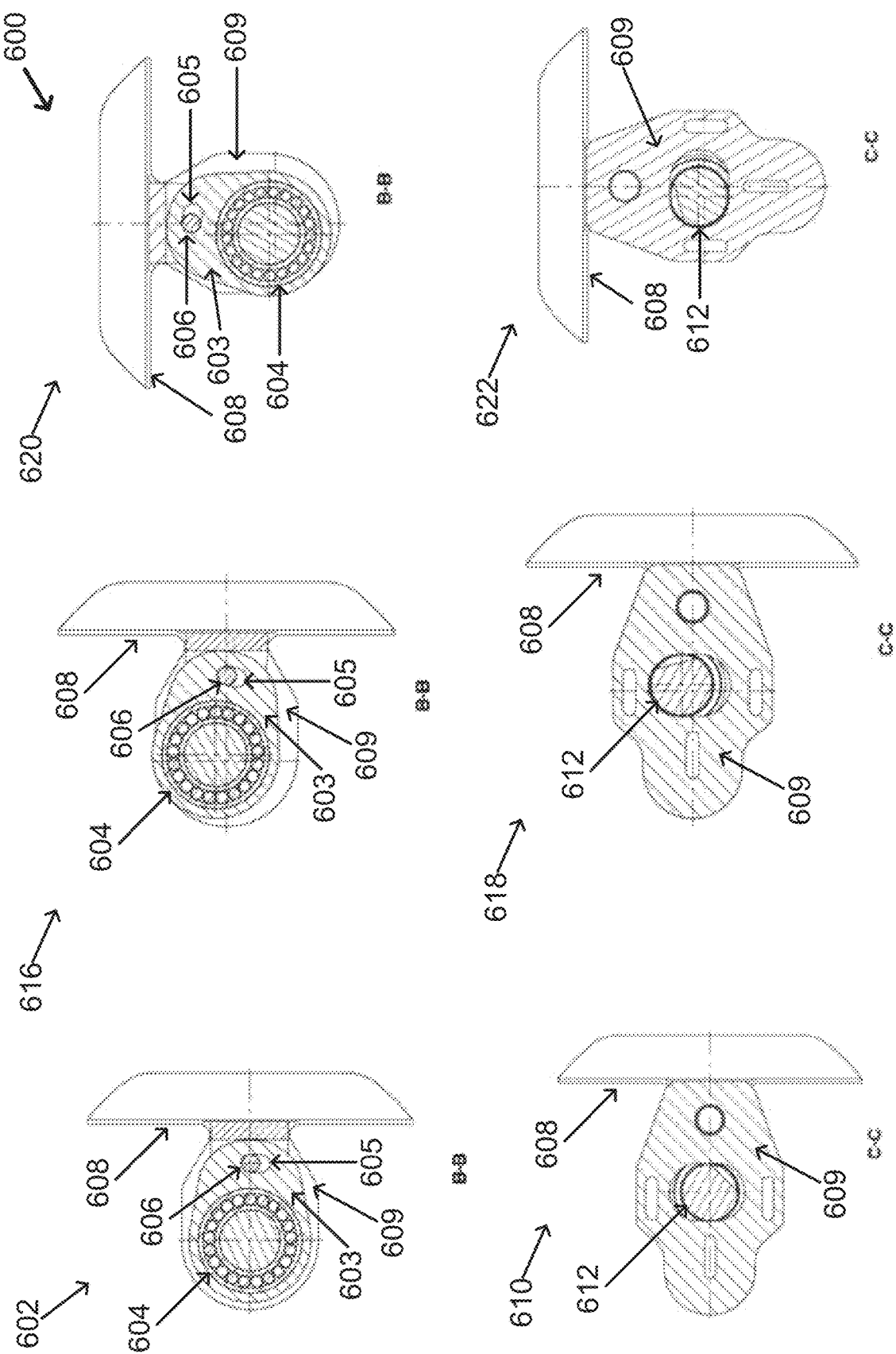
FIG. 6 illustrates cross-sectional top views of the eccentric shaft and the disk at different sections for closed, retracted, and open positions of the disk of the valve assembly.

FIG. 6 illustrates cross-sectional top views of the eccentric shaft and the disk at different sections for closed, retracted, and open positions of the disk of the valve assembly, arranged in accordance with at least some embodiments described herein.

Diagram 600 includes cross-sectional top view 602 of the assembly at a top valve link 603 when the valve disk 608 is in a closed position. Cross-sectional top view 602 also includes ball bearing 604, locking pin 606, locking pin aperture 605, and a partial view of the top valve bracket 609 of the valve disk 608. Diagram 600 also includes cross-sectional top view 616 of the assembly at the top valve link 603 when the valve disk 608 is in a retracted position and cross-sectional top view 620 of the assembly at the top valve link 603 when the valve disk 608 is in an open position. Diagram 600 further includes cross-sectional top views 610, 618, and 622 of the assembly at a top valve bracket 609 when the valve disk 608 is in a closed, retracted, and open position, respectively. The cross-sectional top views 610, 618, and 622 include a cross-section of the shaft 612 in addition to the top valve bracket 609 and the valve disk 608.

During an operation, the oblong locking pin aperture 605 may assist with side loading on the locking pin 606 during the about 60-degree rotation. The eccentric shaft's about 60-degree rotation may synchronize top and bottom valve links disengaging the valve disk 608 from a gasket (retraction). Following the retraction, the top valve link 603 and valve disk 608 may rotate together by about 90 degrees to the open position. The bottom valve link (shown in FIG. 5A) may synchronize cam motion of the top valve link 603 for retraction and rotation.

Figure 7:
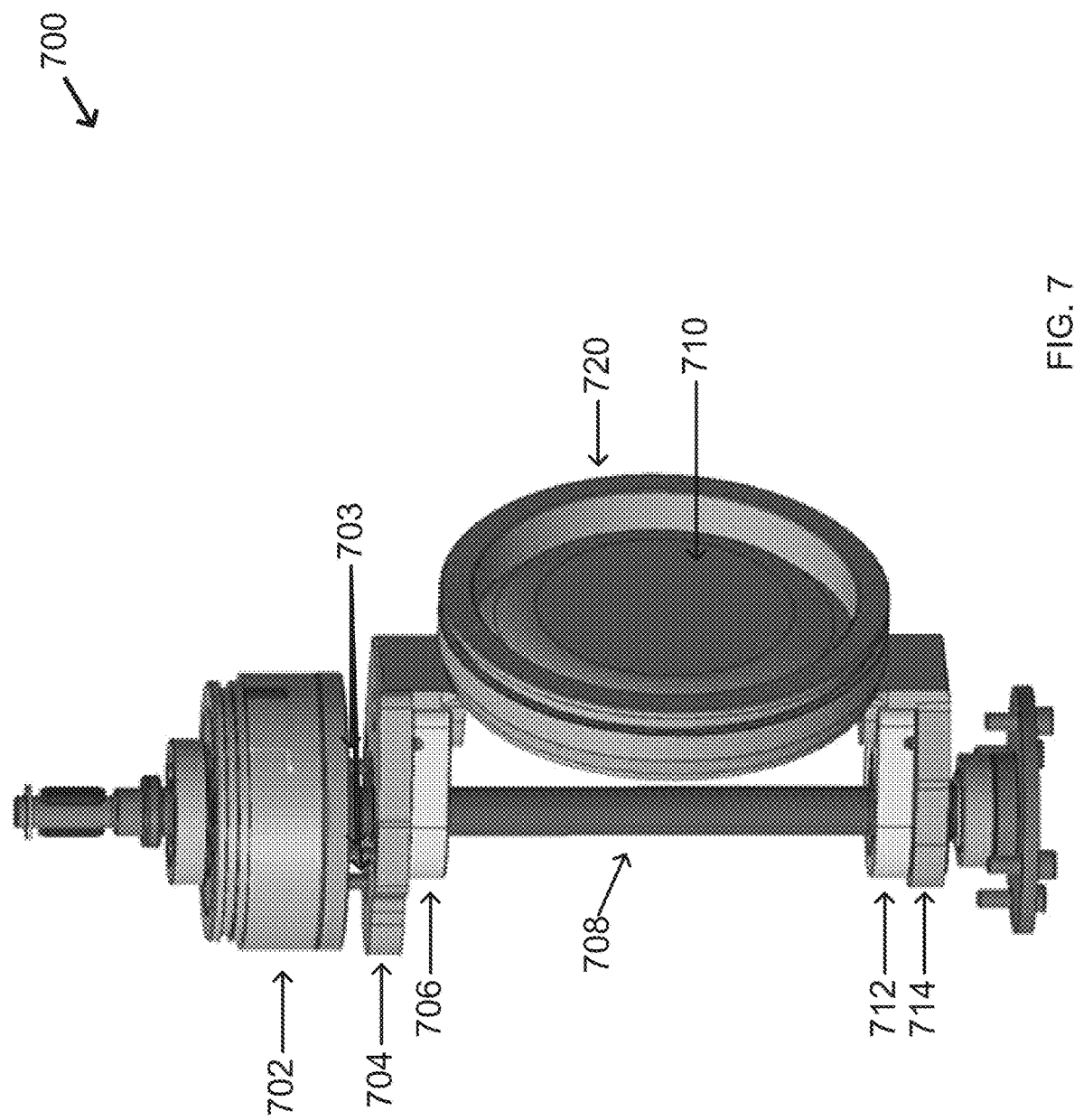
FIG. 7 illustrates an isometric view of a sequencing drive mechanism, shaft, disk, and gasket of a dual motion shutoff valve assembly.

FIG. 7 illustrates an isometric view of a sequencing drive mechanism, shaft, disk, and gasket of a dual motion shutoff valve assembly, arranged in accordance with at least some embodiments described herein.

Diagram 700 shows a sequencing drive assembly 702 and a single shaft 708 driven by the sequencing drive assembly 702. The sequencing drive assembly 702 is mechanically coupled to a top bracket 704 of the valve disk 710 through the guide pins 703. A further coupling is provided through the shaft 708, top valve link 706, and the top bracket 704 of the valve disk 710. The shaft 708 is further coupled to the valve disk 710 through the bottom valve link 712 and bottom bracket 714 of the valve disk 710. A gasket 720 of a valve assembly is also shown.

In a closed position, the valve disk 710 may be urged against the gasket 720 and form a seal that prevents gases or fluids from flowing through the controllable flow path. The sequencing drive assembly 702 may include a mechanism comprising an inner driver ring, an outer driver ring, and interlocking rollers as shown and discussed in the figures above. The mechanism may cause the outer ring, and thereby the valve disk 710 to remain angularly stationary as the shaft 708 makes the initial about 60-degree turn from the closed position. The shaft's initial 60-degree rotation while engaged together with the inner driver ring may act on top and bottom valve links 706, 712 and cause the valve disk 710 to retract linearly from a sealing surface of the gasket 720. In some examples, the gasket 720 may be spring energized.

At the end of the about 60-degree rotation (retraction), the inner driver ring may engage the outer driver ring through the interlocking rollers and allow the outer driver ring to be rotated when the shaft 708 further rotates. Thus, the shaft 708 may rotate both the inner and outer driver rings of the sequencing drive assembly 702, and thereby the valve disk 710 for about an additional 90 degrees before being stopped via an actuator coupled to the sequencing drive assembly 702. This additional about 90-degree rotation may align a spherical surface of the valve disk 710 with the controllable flow path of the valve assembly such that the valve assembly is in the open position.

Starting from the open position, a reverse rotation of the shaft 708 may cause the valve disk 710 to rotate by about 90 degrees (with the inner driver ring and outer driver ring of the sequencing drive assembly 702 engaged together) such that a spherical surface of the valve disk 710 is aligned with the sealing surfaces of the gasket 720 (perpendicular to the controllable flow path). At the end of the about 90-degree rotation, the valve disk 710 has not formed a seal with the gasket 720 yet because it is linearly disengaged (e.g., by about 0.06 inch) from the gasket 720.

At the end of the about 90-degree rotation from the open position, the inner driver ring may become disengaged from the outer driver ring of the sequencing drive assembly 702. The actuator may rotate the shaft through the sequencing drive assembly 702 for another about 60 degrees, during which the inner driver ring may rotate and the shaft and the inner driver ring may act on the top and bottom valve links 706, 712 causing the valve disk 710 to linearly move toward the gasket 720 and engage the sealing surfaces of the gasket 720 effective to place the valve assembly in the closed position again.

Ball or butterfly valve assemblies include one or more seals formed between gaskets of inlet or outlet ports of a valve assembly and a surface of a metal ball or a butterfly disk. Thus, the metal ball or butterfly disk rubs against the sealing surfaces during opening and closing operations, which may result in increased friction and an increased operational torque requirement. The sealing surfaces (of the gaskets and/or metal ball/butterfly disk) may eventually wear out and exhibit valve internal leakage after being subjected to nominal service cycle life.

The benefits of the presently disclosed valve assembly devices are numerous. For example, the valve assemblies disclosed herein may incorporate a sequencing drive mechanism in the valve body and utilize an eccentric shaft mechanism to linearly disengage the valve disk away from the gasket prior to rotation. The dual motion (retraction and rotation) may increase gasket life (thereby, valve life) by reducing friction during opening and closing operations of the valve assembly, may also reduce required operating torque for opening and closing operations, reduce pressure drop due to disk motion, and may also reduce valve leakage.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A dual motion shutoff valve assembly comprising:
    a valve body having an inner wall, a first port defined by a first portion of the inner wall, a second port defined by a second portion of the inner wall, and a controllable flow path defined by a third portion of the inner wall between the first port and the second port;
    a first gasket disposed about the first port;
    a valve disk disposed in the controllable flow path, wherein the valve disk includes a spherical surface portion configured to selectively engage the first gasket in a closed position of the valve assembly effective to form a seal thereon;
    a shaft coupled to the valve disk, wherein the shaft is configured to actuate a position of the valve disk between the closed position and an open position such that the valve disk is placed in a retracted position relative to the first gasket when the shaft is moved to the open position from the closed position or to the closed position from the open position; and a sequencing drive assembly coupled to the shaft and the valve disk, wherein the sequencing drive assembly is configured to actuate a position of the shaft between the open position and the closed position, and comprises:

an inner driver ring configured to surround the shaft, the inner driver ring having a sidewall and two depressions about opposite locations on an outside surface of the sidewall of the inner driver ring;

an outer driver ring configured to surround the inner driver ring, the outer driver ring having a sidewall and two apertures about opposite locations of the sidewall of the outer driver ring;

a retaining housing configured to surround the inner driver ring and the outer driver ring, the retaining housing having a sidewall and two depressions about opposite locations of an inside surface of the sidewall of the retaining housing; and a pair of interlocking rollers configured to slidably engage in the two apertures about the opposite locations of the sidewall of the outer driver ring.

2. The valve assembly of claim 1, wherein the sequencing drive assembly is configured to:

cause the valve disk to disengage the first gasket and retract linearly from the first gasket during a rotation of the shaft from the closed position to the retracted position;

subsequently cause the valve disk to move rotationally from the retracted position to the open position;

cause the valve disk to move rotationally from the open position to the retracted position; and subsequently cause the valve disk to extend linearly toward the first gasket and to engage the first gasket during another rotation of the shaft from the retracted position to the closed position.

3. The valve assembly of claim 1, wherein the sequencing drive assembly is configured to:

from the closed position actuate an about 60-degree rotation of the shaft during which the valve disk is transitioned into the retracted position from the closed position; and actuate a further about 90-degree rotation of the shaft during which the valve disk is transitioned into the open position from the retracted position; and from the open position actuate an about 90-degree rotation of the shaft during which the valve disk is transitioned into the retracted position from the open position; and actuate a further about 60-degree rotation of the shaft during which the valve disk is transitioned into the closed position from the retracted position.

4. The valve assembly of claim 1, wherein the pair of interlocking rollers are configured to:

engage the outer driver ring and the retaining housing together by sliding into the two depressions at opposite locations of the inside surface of the sidewall of the retaining housing during a rotation of the shaft from the closed position to the retracted position or from the retracted position to the closed position of the valve assembly effective to cause the valve disk to remain angularly stationary during the rotation of the shaft; and engage the inner driver ring and the outer driver ring together by sliding into the two depressions at opposite locations of the outside surface of the sidewall of the inner driver ring during another rotation of the shaft from the retracted position to the open position or from the open position to the retracted position of the valve assembly effective to cause the valve disk to rotate during the other rotation of the shaft.

5. The valve assembly of claim 4, wherein the sequencing drive assembly further comprises three guide pins that extend from a bottom surface of the outer driver ring, the three guide pins configured to engage three corresponding apertures in a top bracket coupled to the valve disk, and the three corresponding apertures in the top bracket are shaped to allow the three guide pins to move freely during a rotation of the shaft from the closed position to the retracted position or from the retracted position to the closed position of the valve assembly effective to cause the valve disk to remain angularly stationary during the rotation of the shaft, or cause the top bracket to move during a rotation of the shaft from the retracted position to the open position or from the open position to the retracted position of the valve assembly effective to cause the valve disk to rotate during the rotation of the shaft.

6. The valve assembly of claim 1, wherein the valve disk comprises:

a top bracket that extends from an upper portion of the spherical surface portion of the valve disk and includes a first aperture for the shaft to pass through, wherein an upper cammed portion of the shaft is configured to slidably engage into the first aperture of the top bracket; and a bottom bracket that extends from a lower portion of the spherical surface portion of the valve disk and includes a second aperture for the shaft to pass through, wherein a lower cammed portion of the shaft is configured to slidably engage into the second aperture of the bottom bracket.

7. The valve assembly of claim 6, further comprising:

a top valve link movably coupled to the top bracket;

a bottom shaft movably coupled to the bottom bracket; and a bottom valve link movably coupled to the bottom bracket, wherein the top valve link includes a ball bearing to hold the shaft and a third aperture adapted to receive a locking pin that is inserted through the top bracket to secure the top valve link to the top bracket; and the bottom valve link includes another ball bearing to hold the shaft and a fourth aperture adapted to receive another locking pin that is inserted through the bottom bracket to secure the bottom valve link to the bottom bracket.

8. A dual motion shutoff valve assembly comprising:

a valve body having an inner wall, a first port defined by a first portion of the inner wall, a second port defined by a second portion of the inner wall, and a controllable flow path defined by a third portion of the inner wall between the first port and the second port;

a first gasket disposed about the first port;

a valve disk disposed in the controllable flow path, wherein the valve disk comprises a spherical surface portion configured to selectively engage the first gasket in a closed position of the valve assembly effective to form a seal thereon;

a top shaft coupled to an upper portion of the valve disk, wherein the top shaft is configured to actuate a position of the valve disk between the closed position and an open position such that the valve disk is placed in a retracted position relative to the first gasket when the top shaft is moved to the open position from the closed position or to the closed position from the open position; and a sequencing drive assembly coupled to the top shaft and the valve disk, wherein the sequencing drive assembly is configured to actuate a position of the top shaft between the open position and the closed position, and comprises:

an inner driver ring configured to surround the top shaft, the inner driver ring having a sidewall and two depressions about opposite locations on an outside surface of the sidewall of the inner driver ring;

an outer driver ring configured to surround the inner driver ring, the outer driver ring having a sidewall and two apertures about opposite locations of the sidewall of the outer driver ring;

a retaining housing configured to surround the inner driver ring and the outer driver ring, the retaining housing having a sidewall and two depressions about opposite locations of an inside surface of the sidewall of the retaining housing; and a pair of interlocking rollers configured to slidably engage in the two apertures about the opposite locations of the sidewall of the outer driver ring.

9. The valve assembly of claim 8, further comprising:
a bottom shaft coupled to a lower portion of the valve disk, wherein the valve disk further comprises:
a bottom bracket that extends from a lower portion of the spherical surface portion of the valve disk and includes a first aperture for the bottom shaft to slidably engage.

10. The valve assembly of claim 8, wherein the sequencing drive assembly is configured to:
cause the valve disk to disengage the first gasket and retract linearly from the first gasket during a rotation of the top shaft from the closed position to the retracted position;
subsequently cause the valve disk to move rotationally from the retracted position to the open position;
cause the valve disk to move rotationally from the open position to the retracted position; and
subsequently cause the valve disk to extend linearly toward the first gasket and to engage the first gasket during another rotation of the top shaft from the retracted position to the closed position.

11. The valve assembly of claim 8, wherein the pair of interlocking rollers are configured to:
engage the outer driver ring and the retaining housing together by sliding into the two depressions at opposite locations of the inside surface of the sidewall of the retaining housing during a rotation of the top shaft from the closed position to the retracted position or from the retracted position to the closed position of the valve assembly effective to cause the valve disk to remain angularly stationary during the rotation of the top shaft; and
engage the inner driver ring and the outer driver ring together by sliding into the two depressions at opposite locations of the outside surface of the sidewall of the inner driver ring during another rotation of the top shaft from the retracted position to the open position or from the open position to the retracted position of the valve assembly effective to cause the valve disk to rotate during the other rotation of the top shaft.

12. The valve assembly of claim 8, wherein
the sequencing drive assembly further comprises three guide pins that extend from a bottom surface of the retaining housing, the three guide pins configured to engage three corresponding apertures in a top bracket coupled to the valve disk, and
the three corresponding apertures in the top bracket are shaped to allow the three guide pins to
move freely during a rotation of the top shaft from the closed position to the retracted position or from the retracted position to the closed position of the valve assembly effective to cause the valve disk to remain angularly stationary during the rotation of the top shaft, or
cause the top bracket to move during a rotation of the top shaft from the retracted position to the open position or from the open position to the retracted position of the valve assembly effective to cause the valve disk to rotate during the rotation of the top shaft.

13. The valve assembly of claim 8, further comprising:
a bottom shaft coupled to a lower portion of the valve disk;
a top valve link movably coupled to a top bracket that extends from an upper portion of the spherical surface portion of the valve disk; and
a bottom bracket movably coupled to a bottom shaft that extends from a lower portion of the spherical surface portion of the valve disk.

14. A method to manufacture a dual motion shutoff valve assembly, the method comprising:
forming a valve body having an inner wall, a first portion of the inner wall, a second portion of the inner wall, and a third portion of the inner wall, such that
the first portion of the inner wall defines a first port of the valve body,
the second portion of the inner wall defines a second port of the valve body, and
the third portion of the inner wall, the first port, and the second port define a controllable flow path that extends along the inner wall between the first port and the second port of the valve body;
disposing a first gasket about the first port of the valve body;
forming a valve disk to include at least a spherical surface portion;
disposing the valve disk in the controllable flow path of the valve body such that the spherical surface portion selectively engages the first gasket in a closed position of the valve assembly effective to form a seal thereon;
forming a shaft to actuate a position of the valve disk between the closed position and an open position;
coupling the shaft to the valve disk in an offset manner such that the valve disk is placed in a retracted position relative to the first gasket when the shaft is moved to the open position from the closed position or to the closed position from the open position;
forming a sequencing drive assembly by:
forming an inner driver ring to surround the shaft, the inner driver ring having a sidewall and two depressions about opposite locations on an outside surface of the sidewall of the inner driver ring;
forming an outer driver ring to surround the inner driver ring, the outer driver ring having a sidewall and two apertures about opposite locations of the sidewall of the outer driver ring;

forming a retaining housing to surround the inner driver ring and the outer driver ring, the retaining housing having a sidewall and two depressions about opposite locations of an inside surface of the sidewall of the retaining housing; and forming a pair of interlocking rollers to slidably engage in the two apertures about the opposite locations of the sidewall of the outer driver ring; and coupling the sequencing drive assembly to the shaft and the valve disk to actuate a position of the shaft between the open position and the closed position.

15. The method of claim 14, wherein forming the shaft to actuate the position of the valve disk between the closed position and the open position comprises:

forming a top shaft to actuate the position of the valve disk between the closed position and the open position;

coupling the top shaft to an upper portion of the valve disk in an offset manner such that the valve disk is placed in a retracted position relative to the first gasket when the top shaft is moved to the open position from the closed position or to the closed position from the open position;

forming a bottom shaft coupled to a lower portion of the valve disk; and coupling the bottom shaft to the lower portion of the valve disk.

16. The method of claim 14, wherein forming the sequencing drive assembly comprises:

forming the sequencing drive assembly to cause the valve disk to disengage the first gasket and retract linearly from the first gasket during a rotation of the shaft from the closed position to the retracted position, and subsequently to cause the valve disk to move rotationally from the retracted position to the open position; and cause the valve disk to move rotationally from the open position to the retracted position, and subsequently cause the valve disk to extend linearly toward the first gasket and to engage the first gasket during another rotation of the shaft from the retracted position to the closed position.

17. The method of claim 14, wherein forming the outer driver ring, the retaining housing, and the pair of interlocking rollers comprises:

arranging the pair of interlocking rollers to engage the outer driver ring and the retaining housing together by sliding into the two depressions at opposite locations of the inside surface of the sidewall of the retaining housing during a rotation of the shaft from the closed position to the retracted position or from the retracted position to the closed position of the valve assembly effective to cause the valve disk to remain angularly stationary during the rotation of the shaft; and forming the inner driver ring, the outer driver ring, and the pair of interlocking rollers comprises:

arranging the pair of interlocking rollers to engage the inner driver ring and the outer driver ring together by sliding into the two depressions at opposite locations of the outside surface of the sidewall of the inner driver ring during a rotation of the shaft from the retracted position to the open position or from the open position to the retracted position of the valve assembly effective to cause the valve disk to rotate during the rotation of the shaft.

\* \* \* \* \*